Feb. 26, 1963  G. P. DIRTH ET AL  3,078,746
GAGE CONTROL SYSTEM FOR STRIP MILL
Original Filed Nov. 21, 1958  2 Sheets-Sheet 1
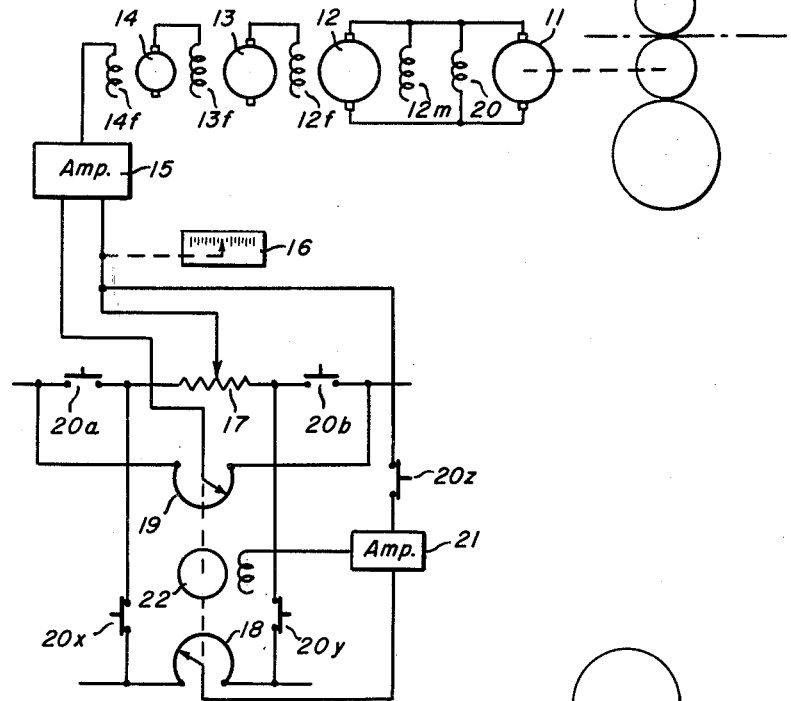
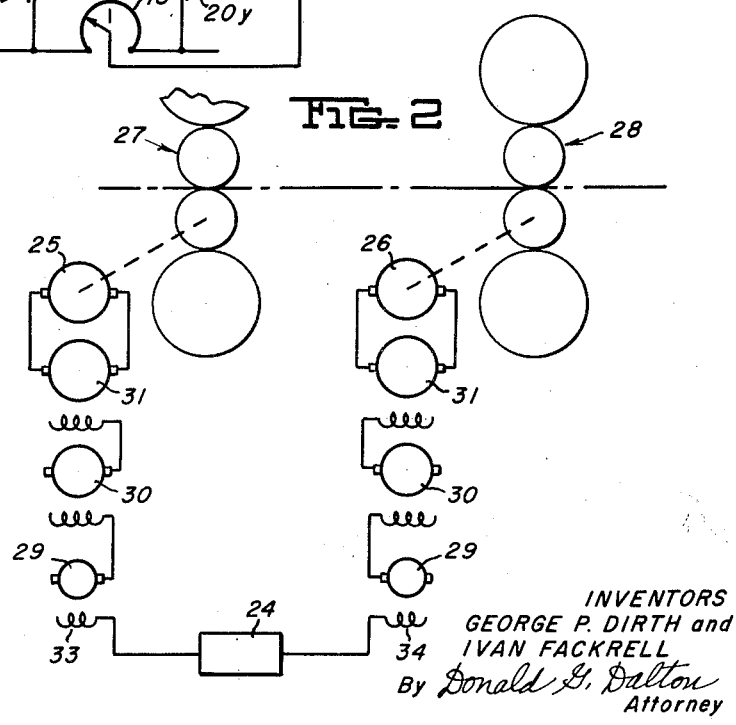
INVENTORS
GEORGE P. DIRTH and
IVAN FACKRELL
By Donald G. Dalton
Attorney

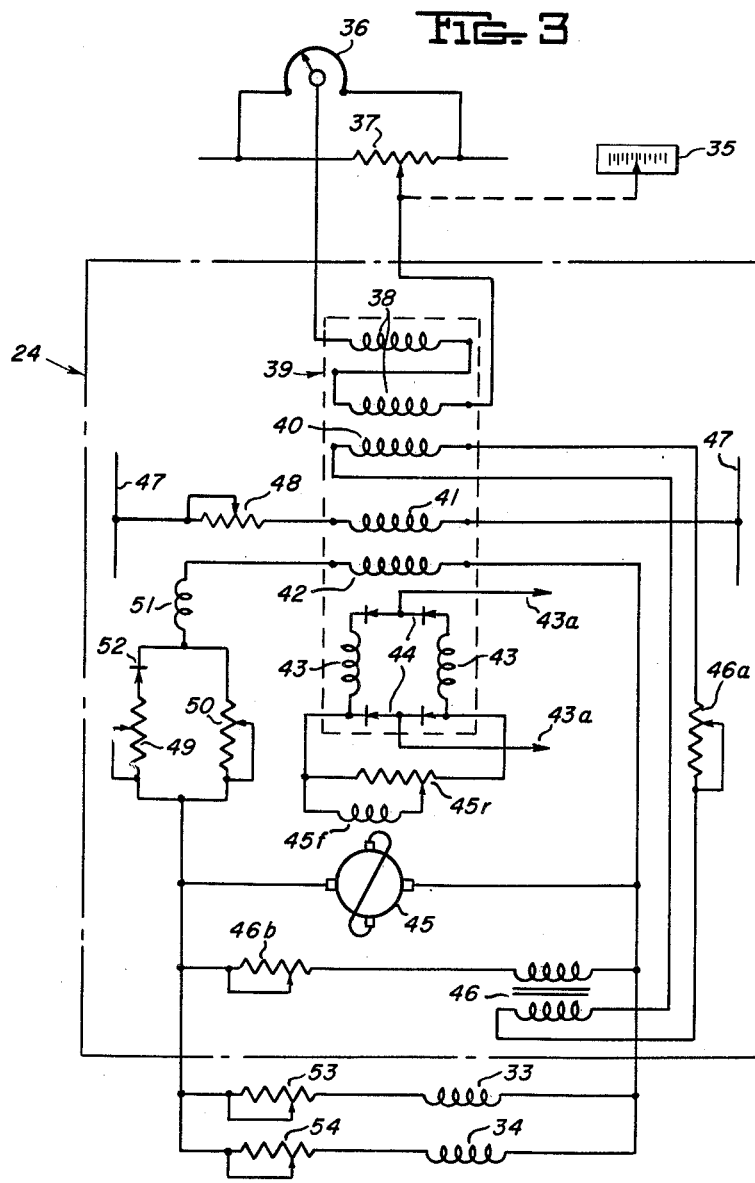

United States Patent Office 3,078,746
Patented Feb. 26, 1963

3,078,746
GAGE CONTROL SYSTEM FOR STRIP MILL
George P. Dirth, 867 Holly Hill Drive, Walnut Creek,
Calif., and Ivan Fackrell, 2655 Richard Ave., Concord,
Calif.
Original application Nov. 21, 1958, Ser. No. 775,422, now
Patent No. 3,036,481, dated May 29, 1962. Divided
and this application Nov. 25, 1959, Ser. No. 855,421
2 Claims. (Cl. 80—35)

This invention relates to a system for controlling the speeds of rolling-mill motors to maintain uniform the gage of metal strip issuing from the mill.

This is a division from our copending application Serial No. 775,422, now Patent No. 3,036,481, filed November 21, 1958, granted May 29, 1962.

Steel strip is customarily reduced to final gage from an intermediate gage to which it is hot-rolled, by cold rolling in a continuous mill. Manual control of the mill screws and the speeds of the motors driving the several stands of the mill has proved unsatisfactory, to maintain the gage of the finished product within close tolerances. Automatic control systems have therefore been devised. All these systems with which we are familiar, however, are complex, expensive and difficult to maintain. It is accordingly the object of our invention to provide a simple inexpensive control system which is highly effective in operation.

We provide a control system for the motor driving the first stand which establishes a reference voltage after the strip has been initially threaded through the mill and during the early part of the short interval during which the mill accelerates to normal speed, then controls the motor speed by comparing with the reference voltage the thickness of the strip issuing from the first stand. We further provide a novel control system for the last stand or both the last and next-to-last stands, responsive to the gage of the finished strip, effective to control the speeds of the motors driving the stand. The control of motor speed thus obtained varies the tension on the strip between adjacent stands and thereby controls the degree of reduction effected by each stand.

A complete understanding of the invention may be obtained from the following detailed description and explanation which refer to the accompanying drawings illustrating the present preferred embodiment. In the drawings:

FIGURE 1 is a circuit showing diagrammatically the apparatus for controlling the motor driving the first stand;

FIGURE 2 is a schematic diagram showing the control system for the motors of the last and next-to-last stands; and FIGURE 3 is a detailed circuit for a controller shown schematically in FIGURE 2.

Referring now in detail to the drawings and, for the present, particularly to FIGURE 1, the first stand of a continuous cold strip mill indicated at 10 is driven by a direct-current motor 11. Current is supplied to the motor 11 by a direct-current generator 12 driven by any convenient means (not shown). The generator has a control field winding 12f energized by an exciter 13 and a main field winding 12m. The field winding 13f of the exciter is energized by a pilot exciter 14, preferably a rotating regulator which is available from commercial suppliers. The armatures of exciters 13 and 14 are driven by a separate motor (not shown). The field winding 14f of exciter 14 is energized by a saturable-core reactor or magnetic amplifier 15 (General Electric Co. "Amplistat"). By the arrangement described, changes in the output of amplifier 15 will increase or decrease the excitation of pilot exciter 14 and similar changes considerably magnified, will be made in the armature voltages of exciter 13 and generator 12, thus eventually varying the speed of motor 11. This arrangement is conventional and is not part of our invention which concerns the means for controlling amplifier 15.

A gager 16 (Industrial Nucleonics, Inc., "Accuray") is mounted to measure the thickness of strip leaving the first stand 10. In addition to giving a visual indication, gager 16 is mechanically coupled to the moving element of a variable resistor 17. This resistor is adapted to form a Wheatstone bridge with one of two potentiometers 18 and 19, depending on the position of a relay 20 having back contacts 20x, 20y and 20z and front contacts 20a and 20b. Relay 20 is designed and connected to operate at a predetermined time after motor 11 is started, specifically after about half the period required for accelerating the motor from "threading" speed to full speed has elapsed. Before relay 20 operates, its back contacts 20x, 20y and 20z connect resistor 17 and potentiometer 18 in a Wheatstone bridge.

Assuming that the strip has been threaded through the several stands of the mill while driven at low speed and a manual controller (not shown) operated to cause the motors to accelerate to full speed, gager 16 during the first portion of the acceleration period, actuates the movable element of resistor 17 in response to variations in the gage of the strip after passing through the first stand. Such variations will usually be those resulting from non-uniformities in the gage of the hot-rolled strip entering the mill. As the moving element of resistor 17 is shifted one way or the other, the bridge it forms with potentiometer 18 is unbalanced and an amplifier 21 is affected by the degree of unbalance. Amplifier 21 is of the Bristol electronic-conversion type. Its output is applied to the control-field winding of a servo-motor 22 (Holtzer-Cabot, 2 phase) which drives the potentiometer 18 to restore the normally balanced condition of the bridge formed by resistor 17 and potentiometer 18. Potentiometer 18 is of the null-balance type and, with amplifier 21 and motor 22, constitutes the combination more fully shown in Wills Patent No. 2,423,540.

Motor 22 also drives the moving element of potentiometer 19. When relay 20 operates, potentiometer 18 is disconnected from resistor 17 at contacts 20x, 20y and 20z and poteniometer 19 is substituted by closing of contacts 20a and 20b. Thus, poteniometer 19 is first set to establish a reference voltage corresponding to the thickness of the strip leaving the first stand 10 when the mill motors have been accelerated about half way to normal speed. Thereafter, any unbalance of the bridge formed by resistor 17 and potentiometer 19 is applied to amplifier 15 and serves as already explained to regulate the speed of the first stand 10. It is thus evident that, after initially establishing a setting of potentiometer 19 according to the thickness of the strip issuing from the first stand 10 during the first part of the start-up of the mill, the speed of the motor 11 is subsequently controlled to regulate tension according to this independent reference throughout the rolling of the remainder of the coil. The speed-control of motor 11, of course, is arranged to reduce the motor speed if the strip thickness is too great, thereby increasing the interstand tension. Conversely, if the strip thickness is too small, the motor speed is increased to decrease interstand tension.

FIGURE 2 illustrates how a tension controller 24 (shown in detail in FIGURE 3) operates in the same manner as amplifier 15, to vary the speeds of the motors 25 and 26 driving the next-to-last stand 27 and the last stand 28 of a conventional mill comprising four or five stands. The controller 24 operates in each case through a pilot exciter 29, which is preferably a commercially available rotating regulator, an exciter 30 and a generator 31 which supplies current to the motor, in the manner explained in connection with FIGURE 1. The pilot exciters have field windings designated 33 and 34, respectively. It thus remains only to describe the apparatus and circuit making up controller 24 by reference to FIGURE 3.

As shown in FIGURE 3, a gager 35 similar to that shown at 16 in FIGURE 1, measures the thickness of the strip leaving the last stand 28. A manually adjustable potentiometer 36 is set to produce a voltage corresponding to the desired finished gage of the strip. Potentiometer 36 is connected with a variable resistor 37 to form a Wheatstone bridge. The movable element of the resistor is mechanically coupled to gager 35 so as to be shifted in accordance with variation in gage of the finished strip. A voltage determined by the position of the movable element of resistor 37 relative to the point at which potentiometer 36 is set, is effective to energize the control or input winding 38 of a magnetic amplifier or saturable-core reactor 39. The reactor is generally of known construction and has, in addition to the input winding 38, a stabilizing winding 40, a biasing winding 41 and a feed-back winding 42. It also has output windings 43 controlling the voltage from an alternating-current source 43a which is applied to a full-wave rectifier 44. A direct-current control generator 45 preferably a rotating regulator such as the General Electric "Amplidyne," driven by any convenient means, has its field winding 45f connected across the rectifier in series with a rheostat 45r, and it is therefore energized according to the output from the reactor.

Winding 40 of reactor 39 is energized through a control rheostat 46a by a stabilizing transformer 46 connected across generator 45 in accordance with changes in the voltage thereof. Winding 41 is energized from a constant-voltage direct-current source 47 under the control of a rheostat 48. Feed-back winding 42 is connected across generator 45 in series with a pair of rheostats 49 and 50 in parallel and in inductor or choke coil 51. A rectifier 52 in series with rheostat 49 prevents flow of current therethrough in one direction. The output of generator 45 is applied to the pilot-exciter field windings 33 and 34 connected thereacross, in series with control rheostats 53 and 54, respectively. Rheostat 49 is adjusted for corrections necessitated by excessive strip thickness and rheostat 50 for corrections incident to the production of undergage strip.

The provision of rheostats 49 and 50 and the rectifier 52 in series with the former permits independent adjustment of current of opposite polarities through the feed-back winding, to compensate for the varying slope of the saturation curve of the core of reactor 39 in the areas of positive and negative magnetizing forces.

We have found that, for stable regulation of final strip gage, it is important that the correcting voltage be displaced in time relative to the initiating change in signal voltage. This delay is effected by the choke coil 51 which, in a particular instance, has a value of 8 henries at 100 milliamperes.

From the foregoing, it will be evident that, when the gage of the finished strip leaving the last stand departs from the desired value, a correcting voltage is introduced into amplifier 39 which then varies the excitation of generator 45 causing it to modify the excitation of the pilot exciters for the generators supplying motors 25 and 26 so their speeds will be adjusted to bring the strip gage back to the correct value by applying more or less tension to the strip between the next-to-last and last stands. The arrangement is such that excessive thickness of the finished strip will cause motors 25 and 26 to speed up slightly. Conversely, undergage strip will cause these motors to slown down slightly.

By virtue of the feed-back winding 42, any corrective action initiated by an unbalance of bridge 36, 37, continues to be applied until a different correction is called for, maintaining the correcting action as the voltage from the bridge disappears. The amount of correction exerted for a given departure from proper gage is controlled by the adjustment of rheostats 53 and 54.

The system of our invention is simple and relatively inexpensive yet highly effective in actual operation. The control system for the speed of the motor of the first stand establishes a reference voltage according to the thickness of the leading-end portion of the strip after passing through the stand and then controls the tension applied to the remainder of the strip to maintain a constant ratio between thickness and that voltage which latter is, of course, related to the tension necessary for the proper reduction of a particular thickness of strip entering the mill.

The control system for the last stand or last two stands by virtue of feed-back winding 42 on reactor 39 has an integrating characteristic, i.e., it applies a small correction not momentarily but over an extended period of time and thus lessens the possibility of hunting as a result of overcorrection. The initially applied correction, furthermore, is maintained as the error corrected for is diminished, preventing the recurrence of the condition for which correction was made.

Although we have disclosed herein the preferred embodiment of our invention, we intend to cover as well any change or modification therein which may be made without departing from the spirit and scope of the invention.

We claim:

1. In a control system for a strip-rolling mill including a motor driving the mill, a generator supplying current to the motor, and means furnishing excitation to the field winding of the generator, the combination therewith of a gager measuring the thickness of strip issuing from the mill, a rotating regulator connected to said excitation means, a saturable-core reactor controlling the excitation of said regulator, means controlled by said gager for varying the output of said reactor, said reactor having a feed-back winding energized by said regulator, and a pair of rheostats in parallel connected in circuit with said winding, one of said rheostats having a rectifier in series therewith.

2. A control system as defined in claim 1, characterized by a choke coil in circuit with said feed-back winding.

References Cited in the file of this patent
UNITED STATES PATENTS

| | | |
|---|---|---|
| 2,700,128 | Woerdmann | Jan. 18, 1955 |
| 2,762,964 | Sechrist et al. | Sept. 11, 1956 |
| 2,798,170 | Carlisle | July 2, 1957 |
| 2,817,807 | Weir | Dec. 24, 1957 |
| 2,834,927 | Halter | May 13, 1958 |
| 2,836,782 | Mazur | May 27, 1958 |
| 2,851,911 | Hessenberg | Sept. 16, 1958 |
| 2,907,947 | Steinitz | Oct. 6, 1959 |
| 2,929,009 | James | Mar. 15, 1960 |
| 2,936,414 | Suozzi | May 10, 1960 |

OTHER REFERENCES

"General Electric Review," pgs. 41–46, October 1950.
"Continuous Gaging," by A. S. Urano, Automation, March 1956, pages 52–57.